(12) United States Patent
Farnworth (10) Patent No.: US 6,304,355 B1
(45) Date of Patent: *Oct. 16, 2001

(54) MODULATION AND DEMODULATION OF LIGHT TO FACILITATE TRANSMISSION OF INFORMATION

(76) Inventor: Warren M. Farnworth, 2004 S. Banner, Nampa, ID (US) 83686-7271

( * ) Notice: Subject to any disclaimer, the term of this patent is extended or adjusted under 35 U.S.C. 154(b) by 0 days.

This patent is subject to a terminal disclaimer.

(21) Appl. No.: 09/107,668

(22) Filed: Jun. 30, 1998

Related U.S. Application Data (63) Continuation of application No. 08/580,630, filed on Dec. 29, 1995.

(51) Int. Cl.$^7$ .............................. H04B 10/04; H04B 10/06

(52) U.S. Cl. .......................... 359/181; 359/182; 359/181; 359/188; 359/195; 359/183

(58) Field of Search .................................... 359/124, 182, 359/126, 127, 133, 180, 181, 188, 190, 191, 10, 34

(56) References Cited

U.S. PATENT DOCUMENTS

| | | |
|---|---|---|
| 3,695,766 * | 10/1972 | Giglio et al. .......................... 356/141 |
| 4,135,202 | 1/1979 | Cutler . |
| 4,560,246 | 12/1985 | Cotter . |
| 4,561,117 | 12/1985 | Kuhn . |
| 4,602,223 | 7/1986 | Goeb et al. . |
| 4,680,767 | 7/1987 | Hakimi et al. . |
| 4,768,191 | 8/1988 | Polcer . |
| 4,775,972 | 10/1988 | Ih et al. . |

(List continued on next page.)

OTHER PUBLICATIONS

Mike Gilmore *Fibre Optic Cabling Theory, Design and Installation Practice*, pp. 11–27, 1991.
"Optoelectronic Interconnections", *Microelectronics Packaging Handbook*, pp. 437–441, 1989.
J.P. Mathieu, "Interference", *Optics Parts 1 and 2*, pp. 18–21, 1975.
Sadakuni Shimada, "Introduction to Coherent Lightwave Communications", *Coherent Lightwave Communications Technology*, pp. 1–3, 1995.
"Radiofrequency Communications: AM", Chapter 13, pp. 892–895, *The Art of Electronics*.

*Primary Examiner*—Jason Chan
*Assistant Examiner*—M. R. Sedighian (57) ABSTRACT

A communication system including a light modulator system includes a laser that produces a high frequency carrier wave signal and a laser information signal source that produces a much lower frequency information signal. The carrier wave signal passes through a first pinhole in a screen to a light mixer cavity. The information signal passes through a second pinhole in the screen to the light mixer cavity, the signals being mixed in the light mixer cavity after passing through their respective pinholes. The resulting signal components include a sum of the carrier wave signal and the information wave signal. A pickup fiber is positioned and sized to receive and transmit only the sum of the carrier wave signal and the information wave signal. The pickup fiber is connected to the local end of a fiber optic cable. A light demodulator system at the remote end of the fiber optic cable includes a laser that produces a remote carrier wave signal that is mixed in another, similar light mixer cavity with the output of the fiber optic cable. The light signal components resulting from the mixing of the remote carrier wave signal and the fiber optic cable output signal are received by a light sensitive detector plate, which electronically outputs the components to a detector which is sensitive to the difference frequency between the remote carrier wave signal and the sum signal, to recover the information representative of the laser information signal.

45 Claims, 2 Drawing Sheets

U.S. PATENT DOCUMENTS

| | | |
|---|---|---|
| 4,827,395 | 5/1989 | Anders et al. . |
| 4,831,662 | 5/1989 | Kuhn . |
| 4,913,547 | 4/1990 | Moran . |
| 5,062,155 * | 10/1991 | Eda ........................................ 359/189 |
| 5,121,241 | 6/1992 | Veith . |
| 5,251,053 | 10/1993 | Heidemann . |
| 5,285,306 | 2/1994 | Heidemann . |
| 5,339,183 | 8/1994 | Suzuki . |
| 5,371,622 | 12/1994 | Khoe et al. . |
| 5,446,574 | 8/1995 | Djupsjobacka et al. . |
| 5,455,704 | 10/1995 | Mizuochi et al. . |
| 5,535,051 * | 7/1996 | Basiev et al. ........................ 359/342 |
| 5,592,321 * | 1/1997 | Elberbaum ........................... 359/173 |
| 5,596,667 | 1/1997 | Watanabe . |
| 5,644,664 | 7/1997 | Burns et al. . |
| 5,655,832 * | 8/1997 | Peika et al. .......................... 362/296 |
| 5,796,506 * | 8/1998 | Tsai ...................................... 359/191 |
| 5,847,853 * | 12/1998 | Farnworth ............................ 359/124 |
| 5,896,211 * | 4/1999 | Watanabe ............................. 359/124 |

\* cited by examiner

MODULATION AND DEMODULATION OF LIGHT TO FACILITATE TRANSMISSION OF INFORMATION

This application is a continuation of Ser. No. 08/580,630 filed Dec. 29, 1995.

BACKGROUND OF THE INVENTION

1. Field of the Invention

The invention relates to a system and method for modulating a combined light information signal and light carrier wave signal for transmission through an optical transmission link and demodulating the combined signal after reception to extract the transmitted information. More particularly, the invention relates to such a system and method of extremely simple and robust construction and which allow use of commercially available lasers and low frequency switching electronics for conversion of electronic domain information input signals to light signals and for retrieval of information from the light signals with reconversion to the electronic domain.

2. State of the Art

Optical communication systems allow information to be transmitted in the form of light. Fibre optic cables may be used to transmit the information from a transmitter to a receiver. Fibre optic cables can transmit light at extremely high speed and with relatively small power loss.

Figure 1:
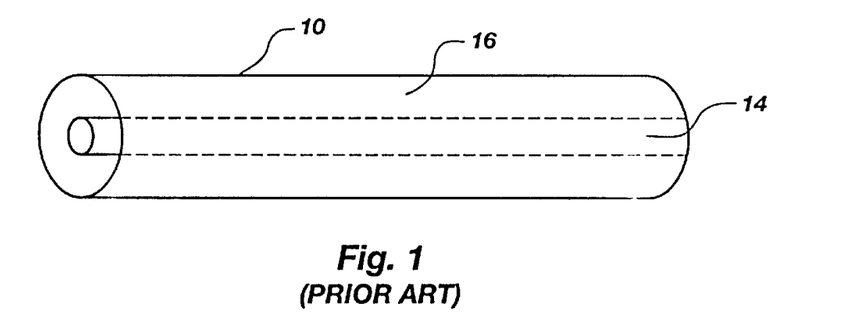
FIG. 1 shows a perspective view of a section of fibre optic cable.

Referring to FIG. 1, a typical fibre optical cable consists of an optical core 14 surrounded by an optical cladding 16. The light is transmitted through core 14. As used herein, "light" refers to electromagnetic radiation that may be effectively transmitted through fibre optic cable and associated components, or other optic transmission systems known or contemplated in the art.

All materials that allow the transmission of electromagnetic radiation including light have an associated refractive index n, which is the ratio of the speed of light in a vacuum to the speed of light in the material. The speed of light in a vacuum is normalized to 1. The speed of light in a vacuum is constant regardless of the wavelength of the light. By contrast, the speed of light in a material is a function of wavelength and the structure of the material. Accordingly, the refractive index is a function of the wavelength of the light and the structure of the material.

Refraction refers to bending of light due to variations in the refractive index. As a ray of light passes from one material (or a vacuum) to another material, it is possible for the ray to refract, reflect, or partially refract and partially reflect. (The ray may also be partially absorbed.) Refracted rays are sometimes called transmitted rays, which term will be used herein to avoid confusion of subscripts.

The following three laws govern the relationship between incident, reflected, and transmitted (refracted) rays. First, the incident, reflected, and transmitted rays all reside in a plane, known as the plane of incidence, which is normal to the interface of the materials. Second, the angle of incidence $\theta_I$ equals the angle of reflection $\theta_R$, where each angle is measured with respect to a line normal to the interface. Third, the angle of incidence $\theta_I$ and the angle of transmittance $\theta_T$ are related by Snell's law shown in equation (1), below:

$$n_I \sin \theta_I = n_T \sin \theta_T \tag{1}$$

where $n_I$ is the refractive index of the material through which the incident ray travels, $n_T$ is the refractive index of the material through which the transmitted ray travels, $\theta_I$ is the angle of the incident ray with respect to the normal, and $\theta_T$ is the angle of the transmitted ray with respect to the normal.

Figure 2A:
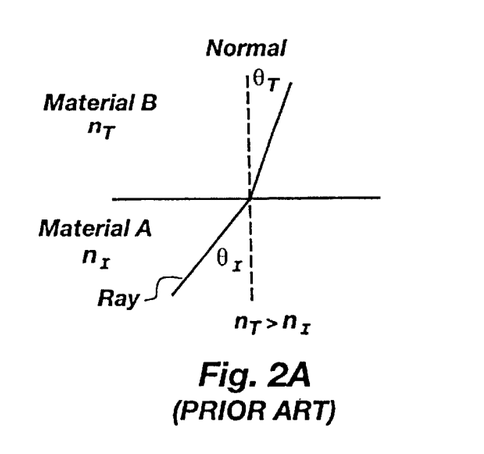
FIG. 2A illustrates refraction in the case in which the refractive index of the base medium is less than that of the adjacent medium.
Figure 2B:
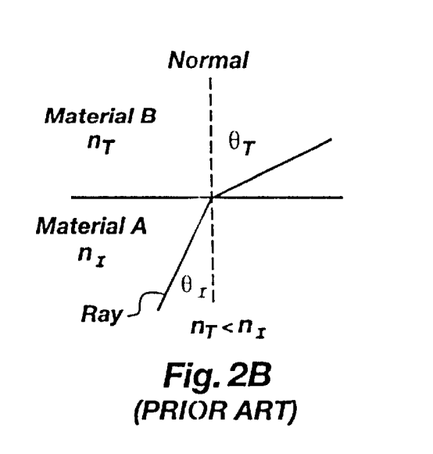
FIG. 2B illustrates refraction in the case in which the refractive index of the base medium is greater than that of the adjacent medium.

An example of refraction is shown in FIGS. 2A and 2B. Referring to FIGS. 2A and 2B, a ray travels from Material A, having refractive index $n_I$, to Material B, having a refractive index $n_T$. The ratio of the angle of incidence $\theta_I$ to the angle of transmittance $\theta_T$ is governed by Snell's law, shown in equation (1). Generally, where $n_T > n_I$ (as in FIG. 2A), $\theta_T < \theta_I$. Where $n_T < n_I$ (as in FIG. 2B), $\theta_T > \theta_I$. (Of course, a larger $\theta_I$ also results in a larger $\theta_T$.) At $\theta_T = 90°$, $\theta_I$ is defined to be at critical angle, denoted $\theta_C$. The critical angle $\theta_C$ is defined in equation (2) below:

$$\theta_C = \sin^{-1}(n_T/n_I) \tag{2}$$

For $\theta_I > \theta_C$, all of the incident ray is totally internally reflected, remaining in the incident medium. An ideal fibre optic cable has total internal reflection, which leads to a relatively small amount of loss in the transmission of light through the cable.

Figure 3:
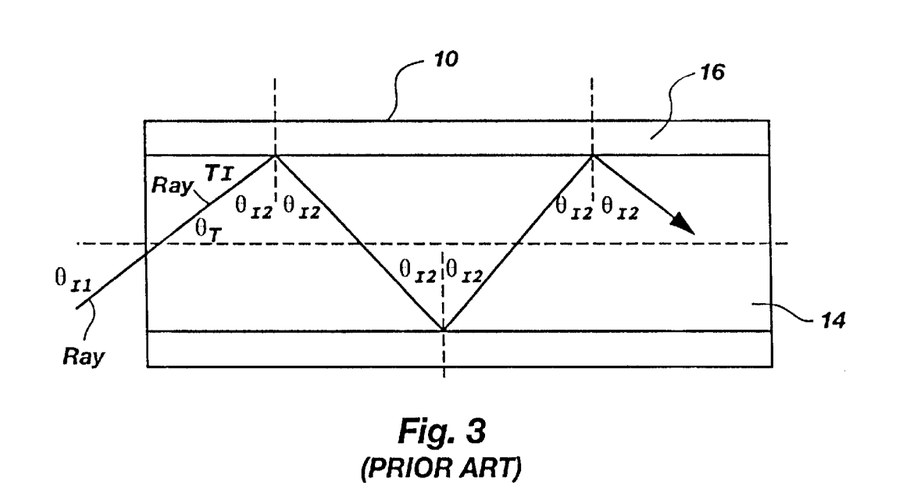
FIG. 3 illustrates total internal reflection in a fibre optic cable.

Referring to FIG. 3, one end of fibre optic cable 10 interfaces with air, which has a refractive index $n_1$ (which happens to be about 1.00027). Core 14 has a refractive index $n_2$, where $n_2 > n_1$. Cladding 16 has a refractive index $n_3$. Dashed lines show the normal with respect to the air-core interface and the core-cladding interface. An incident ray hits the air-core interface at angle $\theta_{I1}$. The transmitted (refracted) ray is referred to as ray TI to designate the ray as both a transmitted ray with respect to the air-core interface and an incident ray with respect to the core-cladding interface. The angle of transmittance $\theta_T$ may be derived according to Snell's law, shown in equation (1).

An angle of incidence $\theta_{I2}$ inside core 14 equals 90° minus $\theta_T$. If $\theta_I > \theta_C$, there will be total internal reflection and ray TI will continue to transmit through core 14 at angle $\theta_{I2}$ until another interface is reached. Further, there is no loss of radiated power at the reflection (although there is loss as the light passes through core 14).

If $\theta_I$ is too large, $\theta_{I2}$ cannot be greater than $\theta_C$, and there will not be total internal reflection. The maximum incident angle $\theta_{MAX}$ is derived in equation (3), below:

$$\theta_{MAX} = \sin^{-1}((1/n_1)(n_2^2 - n_3^2)^{1/2}) \tag{3}$$

where $n_1$, $n_2$, and $n_3$ are the refractive indices defined above in connection with FIG. 3. Accordingly, if $\theta_I > \theta_{MAX}$, there will not be total internal reflection.

Interference refers to the consequence which arises when two light waves starting from the same point source or from two identical point sources arrive at some point P after having travelled two trajectories with different lengths. Generally, the two light waves have the same frequency, but different phases at the time they reach point P. However, the inventor has discovered that it is possible to employ the interference phenomenon with laser light waves of different frequencies and from different sources, as the description of the present invention will hereinafter show.

Modulation is used to impress information from one signal into another signal to create a modulated signal. There are various types of modulation, including amplitude modulation and frequency modulation.

Amplitude modulation is a method of transmitting an information signal by superimposing it on a carrier signal which has a much higher frequency. Consider the following simple example. A carrier signal $\cos \omega_C t$ is varied in amplitude by a modulating information signal $\cos \omega_M t$, where $\omega_M$ is much less than $\omega_C$. The resulting modulated signal $I_{Mod}$ is shown in equation (4), below:

$$I_{Mod} = (1 + M \cos \omega_M t) \cos \omega_C t \quad (4),$$

where M is the modulating index, which is less than or equal to 1, $\omega_M = 2\pi f_M = 2\pi/\lambda_M$, and $\omega_C = 2\pi f_C = 2\pi/\lambda_C$. $I_{Mod}$ may be rewritten as in equation (5), below:

$$I_{Mod} = \cos \omega_C t + m/2(\cos(\omega_C + \omega_M)t + \cos(\omega_C - \omega_M)t) \quad (5).$$

Equation (5) illustrates that the modulated carrier has power at frequencies $\omega_C$, $\omega_C + \omega_M$, and $\omega_C - \omega_M$. In amplitude modulation, the frequency of the information signal remains constant while the amplitude varies to convey information. In frequency modulation, the frequency of the modulated signal varies depending on the frequency of the information signal.

Where the information (modulating) signal is a complex waveform f(t), the amplitude modulated waveform may be $(K+f(t))*\cos \omega_C t$, where K is a constant that is large enough such that (K+f(t)) is never negative.

In many circumstances, the modulated signal $I_{Mod}$ can be transmitted more easily and efficiently than can the information signal $\cos \omega_M t$. At the conclusion of the transmission, a receiver strips the carrier wave, leaving only the information wave.

Systems are known in the art to modulate and demodulate light signals for information transmission purposes. However, such state-of-the-art systems are complex, expensive and require relatively sophisticated electronic processing to provide a modulated light output signal and to retrieve an electronic signal at the receiving end of the transmission.

SUMMARY OF THE INVENTION

The invention relates to a light communication system for transmitting modulated information. The system may include a source of a first laser light signal containing information and a source of a second laser light signal suitable for use in modulation with the first laser light signal. The first and second laser light signals may be mixed in a local mixer so as to create a multi-component local mixed laser light signal. A receiver element, such as an optical fibre pickup, may be sized and positioned to receive only one of the light signal components emanating from the mixer, such as the frequency summation component. The mixer may include a screen or mask with laterally-spaced or offset pinholes or slits through which the first and second light signals are respectively passed and a cavity in which the passed first and second light signals are mixed through overlapping, similar to the creation of an interference pattern.

The signal component received by the receiver element may be further transmitted through a light transmission link, such as a fibre optic cable, to a remote location. The transmission link may include one or more amplifiers as known in the art, particularly if the signal component is to be transmitted over substantial distances.

The invention may further include a demodulating system for the transmitted signal component that includes a source of a third laser light signal and a remote light mixer at the receiving end of the light transmission link. The third laser light signal and the signal component transmitted through the light transmission link are mixed in a remote light mixer including a screen or mask with pinholes through which the third laser light signal and transmitted signal component pass into a mixing cavity, as previously described, to create a remote mixed signal with a plurality of components.

The demodulating system may also include a light sensitive detector plate that detects the remote mixed signal components and converts them to the electronic domain. A remote detector responsive to a component of the remote mixed signal from the detector plate then produces an electronic output signal corresponding to the information content of the first laser light signal.

The invention is not limited to transmitting and detecting the frequency summation component of the mixed first and second signals. If a different component is transmitted and detected (such as the frequency difference component), a similar procedure may be performed by the remote detector to recover the information of the first laser light signal.

The local receiver, while preferably a pickup fibre, may include another frequency-selective electromagnetic receptor as known in the art.

The present invention may be characterized by its simplicity and robust construction, as well as its ability to employ relatively inexpensive, off-the-shelf, low-frequency electronic switching components and commercially available lasers.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE PREFERRED EMBODIMENTS

Figure 4:
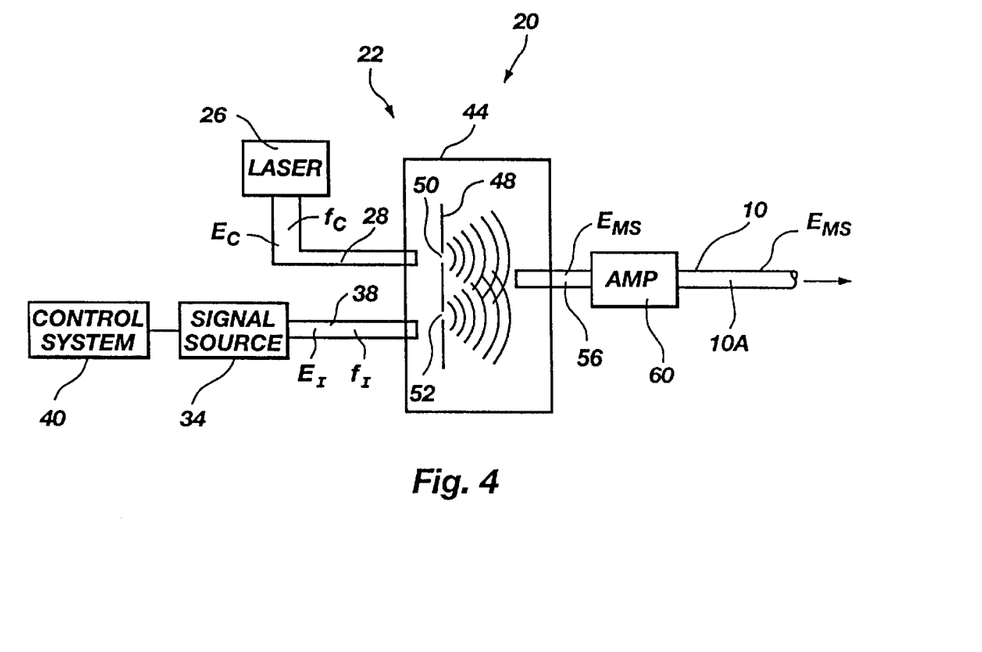
FIG. 4 is a schematic representation of a light modulator system according to a preferred embodiment of the present invention.

Referring to FIG. 4, a communication system 20 according to the invention includes a laser light modulator system 22, which provides a modulated laser light signal to a fibre optic transmission cable 10. Communication system 20 also includes a laser light demodulator system 24 shown in FIG. 5. Cable 10 is part of a fibre optic transmission link between light modulator system 22 and light demodulator system 24. Cable 10 includes a local end 10A (shown in FIG. 4) and a remote end 10B (shown in FIG. 5), as well as an intermediate portion linking end 10A and 10B (not shown).

Returning to FIG. 4, laser 26 provides a light signal $E_C$ having a frequency $f_C$ to an optic fibre 28, the frequency subscript C referring to "carrier." Laser 26 may be a commercially-available diode laser, and frequency $f_C$ is tunable within a range of frequencies. The laser carrier signal may be called a light signal, an optic signal, or merely light. Laser 26 may be termed the carrier wave laser. The signals produced by lasers are coherent. Coherence has various aspects, but includes having virtually all energy of the output signal at a single frequency or within an extremely narrow band of frequencies. Coherence permits maintenance of the information and carrier wave light or grids employed in the invention within tight frequency bounds for modulation and demodulation.

An information signal source 34 provides a laser light signal $E_I$ having a frequency $f_I$ to an optic fibre 38, where the frequency subscript I refers to "information." Information signal source 34 comprises a means for converting a relatively low frequency electronic domain signal received from control system 40 to a light signal transmissible through optic fibre 38, as known in the art. For example, an electrooptic or magnetooptic modulator may serve as the electronic-to-light signal conversion means. Accordingly, signal $E_I$ is also referred to as a light signal. Thus, in accordance with the invention, $E_I$ is representative of signals and frequencies which will not transmit through an optic fibre but which, when modulating light signal $E_C$, can, in fact, be so transmitted.

Merely by way of example and not limitation, the signals $E_C$ and $E_I$ are defined in equations (6) and (7), below:

$$E_C A \cos \omega_C t \tag{6}$$

where $\omega_C = 2\pi * f_C$, and A is the amplitude. For convenience A equals 1 and will be ignored.

$$E_I = M \cos \omega_I t \tag{7}$$

where $\omega_I = 2\pi * f_I$, and M is a modulation index that is less than or equal to 1.

The maximum magnitude of M may be considerably greater than the magnitude of A. In the case of amplitude modulation, the value of M varies to convey information. In the case of frequency modulation, M=1 and the frequency $f_I$ varies to convey information. In either case, the frequency $f_I$ is substantially lower than frequency $f_C$. In this context, "substantially" means within a range between a maximum and minimum spread of frequencies $f_C$ and $f_I$. The maximum spread in frequency modulation (audio) transmission is presently about 4400 to 1. The minimum spread is determined by the sensitivity of the receiver. The maximum spread is limited by the transmission spectrum of the optical fibre. Additionally, different frequencies travel at different velocities in the fibre, with the result that too great a spread between $f_C$ and $f_I$ will cause shifting of the information, commonly known as "smearing." With a standard ≈200 THz signal, an amplitude modulation at a minimum of 26.5 to 1 cycles of carrier to information signal provides a baud rate of over 7 THz. While such a baud rate is obviously unnecessary for most applications, it would be possible to realize such a rate using microwave carrier to signal ratios. (For example, the ratio of an AM band carrier signal of 720 kHz versus an information signal of 20 kHz.) The frequency $f_C$ should be high enough for the resulting modulated signal to be transmitted by fibre optic cable 10.

Information signal source 34 may be a laser or other source of coherent light. The amplitude (preferable) or frequency of signal $E_I$ is dictated by a control system 40, which may be one of various suitable sending instrumentation systems or a computer. For example, control system 40 may comprise an electronic signal-generating apparatus, such as a telecommunications system or a computer, which generates an information signal (audio, video, facsimile, electronic data, etc.) in or convertible to the digital domain for convenience of transmission.

Lasers are preferred for use as the light sources in the present invention as being suitable for use with relatively low frequency electronic components An oscillator could drive, or gate, an LED to create a controlled frequency of pulsing that could be modulated (amplitude) by an information beam. However, such an approach would require very high frequency (and thus costly) generation components, which is a drawback the present invention avoids.

Signals $E_C$ and $E_I$ are transmitted through optic fibres 28 and 38 respectively to light mixer cavity 44. Light mixer cavity 44 comprises a block of optically-transmissive material for the light frequencies passing therethrough, such as air, other gases or gas mixtures, as well as solid materials known in the art. Light mixer cavity 44 contains a screen or mask 48 opaque to the incoming light signal frequencies from optic fibres 28 and 38. Screen 48 is transversely oriented to the associated ends of optic fibres 28 and 38 and includes laterally-spaced or offset pinholes or slits 50 and 52 (such as are commonly used to create an interference pattern from a single source). Optic fibre 28 is pointed at pinhole 50; optic fibre 38 is pointed at pinhole 52. The widths of pinholes 50 and 52 may be at some quantized level, which may be between a quarter of a wavelength and a wavelength of the signals $E_C$ and $E_I$, respectively. The size of pinholes 50 and 52 is greatly exaggerated for purposes of illustration.

After having passed through pinholes 50 and 52, light signals $E_C$ and $E_I$ mix (i.e. overlap) as shown in FIG. 4. Under the definition of interference provided above, the overlapping of signals $E_C$ and $E_I$ is not strictly an interference as defined in the art because $E_C$ and $E_I$ do not start from the same point source or from two identical point sources. Therefore, the term "mixing" will be used herein to describe this phenomenon.

The modulation and demodulation functions employed in the invention are effected through the screen and pinhole system so that the two light signals transmitted through the pinholes create a non-linear function reflective of the information signal being transmitted.

Signals $E_C$ and $E_I$ in light mixer cavity 44 contain four components: (1) $E_C$ alone, (2) $E_I$ alone, (3) a modulated sum $E_{MS}$ of $E_C$ and $E_I$, and (4) a modulated difference $E_{MD}$ between $E_C$ and $E_I$.

A pickup optic fibre 56 or other suitable light receptor is positioned in the path of the overlapping waves of signals $E_C$ and $E_I$. Pickup fibre 56 is positioned distant enough from screen 48 for the two light signals to overlap, and sized such that it picks up substantially only the modulated sum $E_{MS}$ component for transmission. The size of pinholes 50 and 52 may be varied in coordination with placement of pickup fibre 56 for optimum performance.

A pumped crystal amplifier 60 as known in the art receives that portion of signal $E_{MS}$ that is transmitted by pickup fibre 56. Pumped crystal amplifier 60 may be a passive crystal of off-the-shelf design that is commonly used in transatlantic cables for periodic signal amplification for long distance optic fibre. Additional pumped crystal amplifiers may be used as appropriate in the case of long distance optic fibre transmission. The intermediate portion of fibre optic transmission cable 10 (not shown), as well as the remote end of fibre optic transmission cable 10B, are of the same size as local end 10A, so as to transmit only the modulated sum frequency to a light demodulator system 24 at the receiving end of the transmission.

Figure 5:
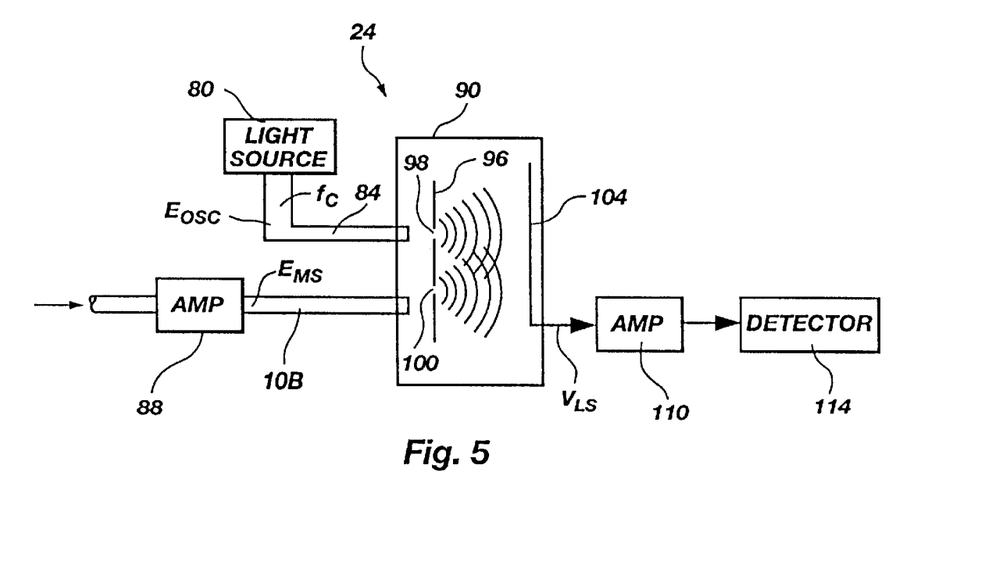
FIG. 5 is a schematic representation of a light demodulator system according to a preferred embodiment of the present invention.

Referring to FIG. 5, a light demodulator system 24 includes receiver fibre optic transmission cable 10B (carrying $E_{MS}$) and a laser 80. Laser 80 provides a laser light signal $E_{OSC}$ having a frequency $f_{OSC}$ to an optic fibre 84, where the frequency subscript OSC refers for convenience by analogy to an oscillating signal at the demodulation end of the system. As with laser 26, laser 80 may be an off-the-shelf, tunable diode laser. While it is preferred that $f_{OSC}$ may equal $f_C$ to reduce noise to the maximum extent, it is not required. If $f_{OSC}$ does not equal $f_C$, more sophisticated processing capabilities may be required in the demodulator system processing electronics.

Signals $E_{OSC}$ and $E_{MS}$ are received by a light mixer cavity 90, which is similar to light mixer cavity 44. Signal $E_{MS}$ may be amplified, as with a pumped crystal amplifier 88, before entering light mixer cavity 90. Light mixer cavity 90 also includes a screen or mask 96 with pinholes 98 and 100, corresponding to the construction of mask 48. Optic fibre 84 is aimed at pinhole 98; optic fibre 10B at pinhole 100. Signals $E_{OSC}$ and $E_{MS}$, passing through their respective pinholes and subsequently overlapping, produce four signal components therefrom: (1) $E_{OSC}$ (2) $E_{MS}$, (3) the modulated sum of $E_{OSC}$ and $E_{MS}$, and (4) the difference between $E_{OSC}$ and $E_{MS}$ which, if $E_{OSC}$ is equal to $E_C$, will equal $E_I$. The four components are received by a light sensitive detector plate 104 as known in the art, which receives all four signal components.

Light sensitive detector plate 104 produces an electronic domain signal $V_{LS}$, which is received by amplifier 110. As with the modulation end of the communication system of the invention, the size of pinholes 98 and 100 and the placement of detector plate 104 may be varied for optimum performance. A detector 114 is sensitive only to the difference frequency signal component received from amplifier 110 and produces an electronic output signal, the amplitude of which varies, mimicking the original, relatively low-frequency, information signal from control system 40, allowing relatively low frequency electrical circuitry to amplify and reroute The signal locally to its intended destination for processing. Thus, the original information signal can readily be recovered from the signal received by the detector. The lower frequency electrical circuitry for handling the difference frequency is far less expensive than higher frequency circuitry required to handle a high frequency light signal such as a carrier wave light signal.

Exemplary applications for communication system 20 include local area networks, wide area networks and, local and long distance telecommunications.

Of course, in many, if not all, applications of the present invention, it is expected that a local light demodulator system would accompany the local light modulator system such that information could be transmitted in both directions. It is expected that, in most cases, a modulator/transmitter would also be a demodulator/receiver or a transceiver, with the functions of lasers 26 and 80 as illustrated and described herein performed by a single laser suitably linked by prism and optic fibres into both the modulation and demodulation portions of an integrated transceiver system.

Although only amplitude and frequency modulation are discussed above, it will be apparent to those skilled in the art that various other modulation techniques may be employed, such as phase modulation. This would, however, require one to send the carrier wave down the same optical fibre as the carrier wave impressed with the information signal, e.g., mixing would not be employed for the addition of a carrier wave signal. Phase detection could also be employed at the receiving end of the communication system.

It is expected that existing off-the-shelf parts are used in fabricating the apparatus of the invention wherever possible, there being no need for extensive use of custom-designed laser and optic transmission and amplification components.

As used in the claims, the terms "connect," "connectable," or "connected to" are not necessarily limited to a direct connection. For example, light sensitive detector plate 104 is connected to detector 114, although it may not be directly connected, due to the presence of an intervening amplifier.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A communication system for transmitting information, the communication system comprising:
   a source of an information light signal representative of information to be transmitted;
   a source of a carrier light signal;
   a light mixer cavity coupled to the information and carrier light signal sources for mixing the information and carrier light signals to create a mixed light signal, wherein the light mixer cavity includes a mask having a first aperture through which the information light signal is directed and a second aperture through which the carrier light signal is directed; and
   a receiver element positioned for receiving a component of the mixed light signal for optical transmission.

2. The system of claim 1 wherein the mixed light signal includes a sum of the information and carrier light signals, and the mixed light signal component received by the receiver element is the sum of the information and carrier light signals.

3. The system of claim 1 wherein the information light signal and the carrier light signal are directed in a mutually parallel and laterally offset relationship, and the mask is oriented transversely to the information and carrier light signals.

4. The system of claim 1 wherein the receiver element comprises a pickup optic fibre sized to transmit substantially only the mixed light signal component.

5. The system of claim 1, further comprising an amplifier coupled to the receiver element for receiving and amplifying the mixed light signal component for transmission to a remote location.

6. The system of claim 5, further comprising a light transmission link coupled to the amplifier, the link comprising a fibre optic cable in communication with the receiver element through the amplifier.

7. The system of claim 1 wherein the light signal sources include lasers.

8. A communication system for receiving information, the communication system comprising:
   a source of an oscillating light signal;
   a light mixer cavity coupled to the oscillating light signal source for mixing the oscillating light signal and a received mixed light signal component representative of the information to produce a mixed light signal, wherein said light mixer cavity includes a block of optically transmissive material for transmitting an optical carrier signal and an optical information signal; and
   a detection device coupled to the light mixer cavity and responsive to a component of the mixed light signal for producing a signal representative of the information represented by the received mixed light signal component.

9. The system of claim 8 wherein the detection device is responsive to a difference component in the mixed light signal.

10. The system of claim 8 wherein the light mixer cavity includes a mask having a first aperture through which the oscillating light signal is directed and a second aperture through which the received mixed light signal component is directed.

11. The system of claim 10 wherein the oscillating light signal and the received mixed light signal component are directed in a mutually parallel and laterally offset relationship, and the mask is oriented transversely to the oscillating light signal and the received mixed light signal component.

12. The system of claim 9 further comprising a light sensitive detector plate positioned for detecting the mixed light signal and coupled to the detection device for providing components of the mixed light signal thereto.

13. A communication system for communicating information, the system comprising:
 a source of an information light signal representative of information to be transmitted;
 a source of a carrier light signal;
 a transmitter light mixer cavity coupled to the information and carrier light signal sources for mixing the information and carrier light signals to create a first mixed light signal having a summation component;
 a receiver element positioned for receiving the summation component of the first mixed light signal;
 a light transmission link coupled to the receiver element for transmitting the summation component;
 a source of an oscillating light signal;
 a receiver light mixer cavity coupled to the light transmission link and the oscillating light signal source for mixing the oscillating light signal and the summation component to create a second mixed light signal having a difference component; and
 a detection device coupled to the receiver light mixer cavity and responsive to the difference component of the second mixed light signal for producing a signal representative of the transmitted information.

14. The system of claim 13 wherein the transmitter light mixer cavity includes a mask having a first aperture through which the information light signal is directed and a second aperture through which the carrier light signal is directed.

15. The system of claim 14 wherein the receiver light mixer cavity includes a mask having a first aperture through which the oscillating light signal is directed and a second aperture through which the summation component is directed.

16. The system of claim 13 wherein the receiver element comprises a pickup optical fibre sized to transmit substantially only the summation component to the light transmission link.

17. The system of claim 13 further comprising a light sensitive detector plate positioned to detect the second mixed light signal and to provide components of the second mixed light signal to the detection device.

18. A transmitter comprising:
 a source of a carrier light signal;
 a source of a modulating light signal;
 a cavity coupled to the carrier and modulating light signal sources for modulating the carrier light signal in accordance with the modulating light signal by mixing the carrier and modulating light signals to form a mixed light signal; and
 a receiver element positioned to receive and optically transmit at least a portion of the mixed light signal.

19. The transmitter of claim 18, wherein the modulating light signal source comprises a device for converting an electronic signal representative of information to be transmitted into the modulating light signal.

20. The transmitter of claim 18, wherein the receiver element is constructed to receive and transmit a component of the mixed light signal that is the summation of the carrier and modulating light signals.

21. A receiver comprising:
 a source of an oscillating light signal;
 a light mixer cavity coupled to the oscillating light signal source for modulating the oscillating light signal in accordance with a received light signal representative of transmitted information by mixing the oscillating and received light signals to form a mixed light signal, wherein said light mixer cavity includes a block of optically transmissive material for transmitting an optical carrier signal and an optical information signal; and
 a detection device coupled to the light mixer cavity and responsive to at least a portion of the mixed light signal to generate an information signal substantially representative of the transmitted information.

22. A light transceiver comprising:
 a source of a carrier light signal;
 a source of a modulating light signal;
 a transmitter cavity coupled to the carrier and modulating light signal sources for modulating the carrier light signal in accordance with the modulating light signal by mixing the carrier and modulating light signals to form a first mixed light signal;
 a receiver element positioned to receive and transmit at least a portion of the first mixed light signal;
 a receiver cavity coupled to the carrier light signal source for modulating the carrier light signal in accordance with a received light signal representative of transmitted information by mixing the carrier and received light signals to form a second mixed light signal; and
 a detection device coupled to the receiver cavity and responsive to at least a portion of the second mixed light signal to generate an information signal substantially representative of the transmitted information.

23. A communication system comprising:
 a transmitter including:
  a source of a carrier light signal;
  a source of a modulating light signal;
  a cavity coupled to the carrier and modulating light signal sources for modulating the carrier light signal in accordance with the modulating light signal by mixing the carrier and modulating light signals to form a first mixed light signal; and
  a receiver element positioned to receive and transmit at least a portion of the first mixed light signal;
 a light transmission link coupled to the transmitter for transmitting the at least a portion of the first mixed light signal; and
 a receiver coupled to the light transmission link for receiving the at least a portion of the first mixed light signal, the receiver including:
  a source of an oscillating light signal;
  a cavity coupled to the oscillating light signal source for modulating the oscillating light signal in accordance with the at least a portion of the first mixed light signal by mixing the oscillating light signal and the at least a portion of the first mixed light signal to form a second mixed light signal; and a detection device coupled to the cavity and responsive to at least a portion of the second mixed light signal to substantially recover the modulating light signal from the second mixed light signal.

24. A transmission method comprising:

generating a first light signal;

generating a second light signal;

filtering said first light signal through a first aperture and filtering said second light signal through a second aperture;

modulating the second filtered light signal in accordance with the first filtered light signal by mixing the first and second light signals in a cavity and thereby generating a mixed light signal; and transmitting at least a portion of the mixed light signal.

25. The method of claim 24, wherein the act of generating the first light signal comprises generating an information light signal representative of information to be transmitted.

26. The method of claim 24, wherein the act of generating the second light signal comprises generating a carrier light signal.

27. The method of claim 24, wherein the act of transmitting at least a portion of the mixed light signal comprises transmitting a component of the mixed light signal that is the summation of the first and second light signals.

28. A reception method comprising:

receiving at least a portion of a first mixed light signal;

generating an oscillating light signal;

demodulating the at least a portion of the first mixed light signal by mixing the at least a portion of the first mixed light signal and the oscillating light signal in a cavity including a screen with apertures and thereby generating a second mixed light signal; and recovering an information signal from the second mixed light signal.

29. An optical transmitter comprising:

an optical carrier signal source for generating an optical carrier signal;

an optical information signal source configured to receive an electrical information signal and convert it to an optical information signal;

a light mixer cavity optically coupled to said optical carrier signal source and said optical information signal source and configured for optically mixing said optical carrier signal and said optical information signal to generate an optical modulated sum signal, wherein said light mixer cavity includes a block of optically transmissive material for transmitting said optical carrier signal and said optical information signal;

a light receptor optically coupled to said light mixer cavity for receiving said optical modulated sum signal; and an optical amplifier optically coupled to said light receptor for amplifying said optical modulated sum signal for transmission along a fibre optic transmission cable.

30. The optical transmitter of claim 29, wherein said optical carrier signal source comprises a laser.

31. The optical transmitter of claim 29, wherein said optical carrier signal source comprises a light emitting diode.

32. The optical transmitter of claim 29, wherein said light mixer cavity further includes a mask disposed within said block of optically transmissive material including a first aperture positioned in a path of said optical carrier signal and a second aperture positioned in a path of said optical information signal for generating said optical modulated sum signal by combining light transmitted through said apertures.

33. The optical transmitter of claim 32, wherein said first aperture is a slit of width between about a quarter wavelength and about a full wavelength of said optical carrier signal.

34. The optical transmitter of claim 32, wherein said second aperture is a slit of width between about a quarter wavelength and about a full wavelength of said optical information signal.

35. The optical transmitter of claim 29, wherein said light receptor is a fibre optic cable.

36. The optical transmitter of claim 29, wherein said optical amplifier is a pumped crystal amplifier.

37. The optical transmitter of claim 29, further comprising a control system coupled to said optical information signal source for generating an electrical information signal input to said optical information signal source for conversion from an electrical information signal to an optical information signal.

38. An optical receiver comprising:

an optical carrier signal source for generating an optical carrier signal;

a receiver fibre optic transmission cable configured to carry an optical modulated sum signal; and a light mixer cavity including a screen with apertures optically coupled to said optical carrier signal source and said receiver fibre optic transmission cable for demodulating said optical modulated sum signal and producing an electronic domain signal representative of information embedded in said optical modulated sum signal.

39. The optical receiver of claim 38, wherein said light mixer cavity includes:

a block of optically transmissive material for transmitting said optical modulated sum signal and said optical carrier signal;

a mask disposed within said block of optically transmissive material including a first aperture positioned in a path of said optical modulated sum signal and a second aperture positioned in a path of said optical carrier signal for generating an optical difference signal by combining light transmitted through said apertures; and a light sensitive detector disposed within said block of optically transmissive material for converting said optical difference signal to said electronic domain signal.

40. The optical receiver of claim 38, further comprising:

an amplifier coupled to said light mixer cavity for receiving said electronic domain signal and amplifying said electronic domain signal; and a detector coupled to said amplifier for detecting said amplified electronic domain signal.

41. An optical transceiver comprising:

a first optical carrier signal source for generating a first optical carrier signal;

an optical information signal source configured to receive an electrical information signal and convert it to an optical information signal;

a first light mixer cavity optically coupled to said first optical carrier signal source and said optical information signal source and configured for optically mixing said first optical carrier signal and said optical information signal to generate an optical modulated sum signal, wherein said first light mixer cavity includes:

a block of optically transmissive material for transmitting said optical carrier signal and said optical information signal; and a mask disposed within said block of optically transmissive material including a first aperture positioned in a path of said optical carrier signal and a second aperture positioned in a path of said optical information signal for generating said optical modulated sum signal by combining light transmitted through said apertures;

an optical amplifier optically coupled to an output of said first light mixer cavity for amplifying said optical modulated sum signal;

a light transmission link coupled to said optical amplifier for transmitting said optical modulated sum signal;

a second optical carrier signal source for generating a second optical carrier signal;

a second light mixer cavity optically coupled to said second optical carrier signal source and said light transmission link for demodulating said optical modulated sum signal and producing an electronic domain signal representative of said information signal, wherein said second light mixer cavity includes:

a block of optically transmissive material for transmitting said optical modulated sum signal and said optical carrier signal;

a mask disposed within said block of optically transmissive material including a first aperture positioned in a path of said optical modulated sum signal and a second aperture positioned in a path of said optical carrier signal for generating an optical difference signal by combining light transmitted through said apertures; and a light sensitive detector disposed within said block of optically transmissive material for converting said optical difference signal to said electronic domain signal.

42. The optical transmission system of claim 41, further comprising a control system coupled to said optical information signal source for generating an electrical information signal input to said optical information signal source for conversion from an electrical information signal to an optical information signal.

43. The optical transmission system of claim 41, further comprising:

an optical amplifier coupled to said second light mixer cavity for receiving said electronic domain signal and amplifying said electronic domain signal; and a detector coupled to said amplifier for detecting said amplified electronic domain signal representative of said information signal.

44. An optical transceiver comprising:

an optical carrier signal source including a beam splitter for generating a first optical carrier signal and a second optical carrier signal;

an optical information signal source configured to receive an electrical information signal and convert it to an optical information signal;

a first light mixer cavity optically coupled to said first optical carrier signal source and said optical information signal source and configured for optically mixing said first optical carrier signal and said optical information signal to generate an optical modulated sum signal, wherein said light mixer cavity includes:

a block of optically transmissive material for transmitting said optical carrier signal and said optical information signal; and a mask disposed within said block of optically transmissive material including a first aperture positioned in a path of said optical carrier signal and a second aperture positioned in a path of said optical information signal for generating said optical modulated sum signal by combining light transmitted through said apertures;

a first optical amplifier optically coupled to an output of said first light mixer cavity for amplifying said optical modulated sum signal and for transmitting said optical modulated sum signal along a light transmission link;

a second light mixer cavity optically coupled to said second optical carrier signal source and said light transmission link for demodulating an a received optical modulated sum signal and producing an electronic domain signal representative of said information signal, wherein said second light mixer cavity includes:

a block of optically transmissive material for transmitting said optical modulated sum signal and said optical carrier signal;

a mask disposed within said block of optically transmissive material including a first aperture positioned in a path of said optical modulated sum signal and a second aperture positioned in a path of said optical carrier signal for generating an optical difference signal by combining light transmitted through said apertures; and a light sensitive detector disposed within said block of optically transmissive material for converting said optical difference signal to said electronic domain signal.

45. The optical transceiver of claim 44, further comprising:

a second optical amplifier coupled to an output of said second light mixer cavity for receiving and amplifying said electronic domain signal;

a control system coupled to said optical information signal source and said second optical amplifier for generating an electrical information signal input to said optical information signal source and for detecting said amplified electronic domain signal representative of said information signal.

* * * * *

UNITED STATES PATENT AND TRADEMARK OFFICE
CERTIFICATE OF CORRECTION

PATENT NO. : 6,304,355 B1
DATED : October 16, 2001
INVENTOR(S) : Warren M. Farnworth It is certified that error appears in the above-identified patent and that said Letters Patent is hereby corrected as shown below:

Title page,
Item [63], Related U.S. Application Data, change "1995." to -- 1995, and issued December 8, 1998 as U.S. Patent No. 5,847,853. --

Item [57], ABSTRACT,
Lines 11, 15, 18 and 20, change "fiber" to -- fibre --
Line 14, change "fiber" to -- fibre -- (both occurrences)

Column 1,
Line 6, after "1995" and before "." insert -- , and issued December 8, 1998 as U.S. Patent No. 5,847,853 --
Line 29, after "cable" insert -- 10 --

Column 2,
Line 14, after "(2)" insert -- , --

Column 3,
Line 4, in the formula, after "cos" change "·" to -- $\omega$ --
Line 16, after "varies" insert -- , --

Column 4,
Line 61, change "end" to -- ends --

Column 5,
Line 26, in the formula, change "$E_cA$" to -- $E_c = A$ --
Line 40, after "$f_I$" change "," to -- . --
Line 49, after "modulation at" change "an" to -- a --

Column 6,
Line 4, after "drive" and "gate" delete "," and change "an LED" to
-- a light emitting diode (LED) --
Line 10, after both "38" and "respectively" insert -- , --
Line 46, after "overlap" delete ","

Column 7,
Line 14, after "98;" insert -- the remote end of --
Line 18, after "(1) $E_{OSC}$" insert -- , --
Line 42, after second occurrence of "networks" delete "and" and insert -- , --

UNITED STATES PATENT AND TRADEMARK OFFICE
CERTIFICATE OF CORRECTION

PATENT NO. : 6,304,355 B1
DATED : October 16, 2001
INVENTOR(S) : Warren M. Farnworth It is certified that error appears in the above-identified patent and that said Letters Patent is hereby corrected as shown below:

Column 9,
Line 12, change "9" to -- 8 --
Line 44, change "14" to -- 13 --

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,304,355 B1
DATED : October 16, 2001
INVENTOR(S) : Warren M. Farnworth It is certified that error appears in the above-identified patent and that said Letters Patent is hereby corrected as shown below:

Title page,
Item [63], Related U.S. Application Data, change "1995." to -- 1995, and issued December 8, 1998 as U.S. Patent No. 5,847,853. --

Item [57], ABSTRACT,
Lines 11, 15, 18 and 20, change "fiber" to -- fibre --
Line 14, change "fiber" to -- fibre -- (both occurrences)

Column 1,
Line 6, after "1995" and before "." insert -- , and issued December 8, 1998 as U.S. Patent No. 5,847,853 --
Line 29, after "cable" insert -- 10 --

Column 2,
Line 14, after "(2)" insert -- , --

Column 3,
Line 4, in the formula, after "cos" change "·" to -- $\omega$ --
Line 16, after "varies" insert -- , --

Column 4,
Line 61, change "end" to -- ends --

Column 5,
Line 26, in the formula, change "$E_cA$" to -- $E_c = A$ --
Line 40, after "$f_I$" change "," to -- . --
Line 49, after "modulation at" change "an" to -- a --

Column 6,
Line 4, after "drive" and "gate" delete "," and change "an LED" to
-- a light emitting diode (LED) --
Line 10, after both "38" and "respectively" insert -- , --
Line 46, after "overlap" delete ","

Column 7,
Line 14, after "98;" insert -- the remote end of --
Line 18, after "(1) $E_{OSC}$" insert -- , --
Line 42, after second occurrence of "networks" delete "and" and insert -- , --

UNITED STATES PATENT AND TRADEMARK OFFICE
CERTIFICATE OF CORRECTION

PATENT NO.   : 6,304,355 B1
DATED        : October 16, 2001
INVENTOR(S)  : Warren M. Farnworth It is certified that error appears in the above-identified patent and that said Letters Patent is hereby corrected as shown below:

Column 9,
Line 12, change "9" to -- 8 --
Line 44, change "14" to -- 13 --

Signed and Sealed this

Twenty-fifth Day of March, 2003

JAMES E. ROGAN
*Director of the United States Patent and Trademark Office*